No. 874,260. PATENTED DEC. 17, 1907.
W. V. TURNER.
FLUID PRESSURE BRAKE.
APPLICATION FILED MAR. 23, 1906.
2 SHEETS—SHEET 1.
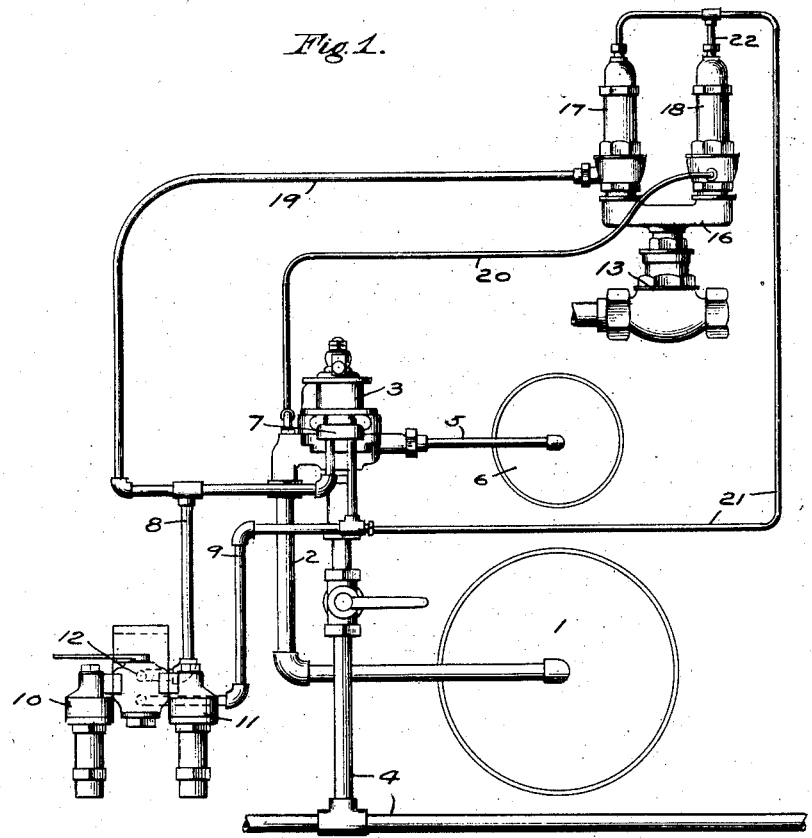
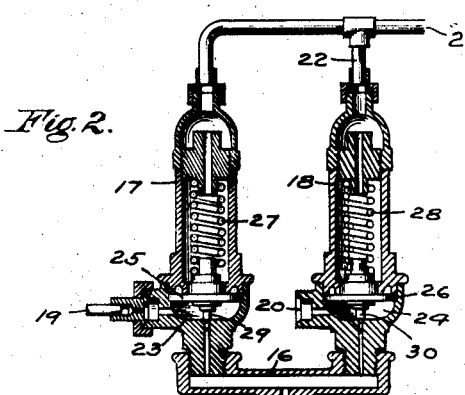
WITNESSES
INVENTOR
Walter V. Turner
by E. Wright
Att'y.

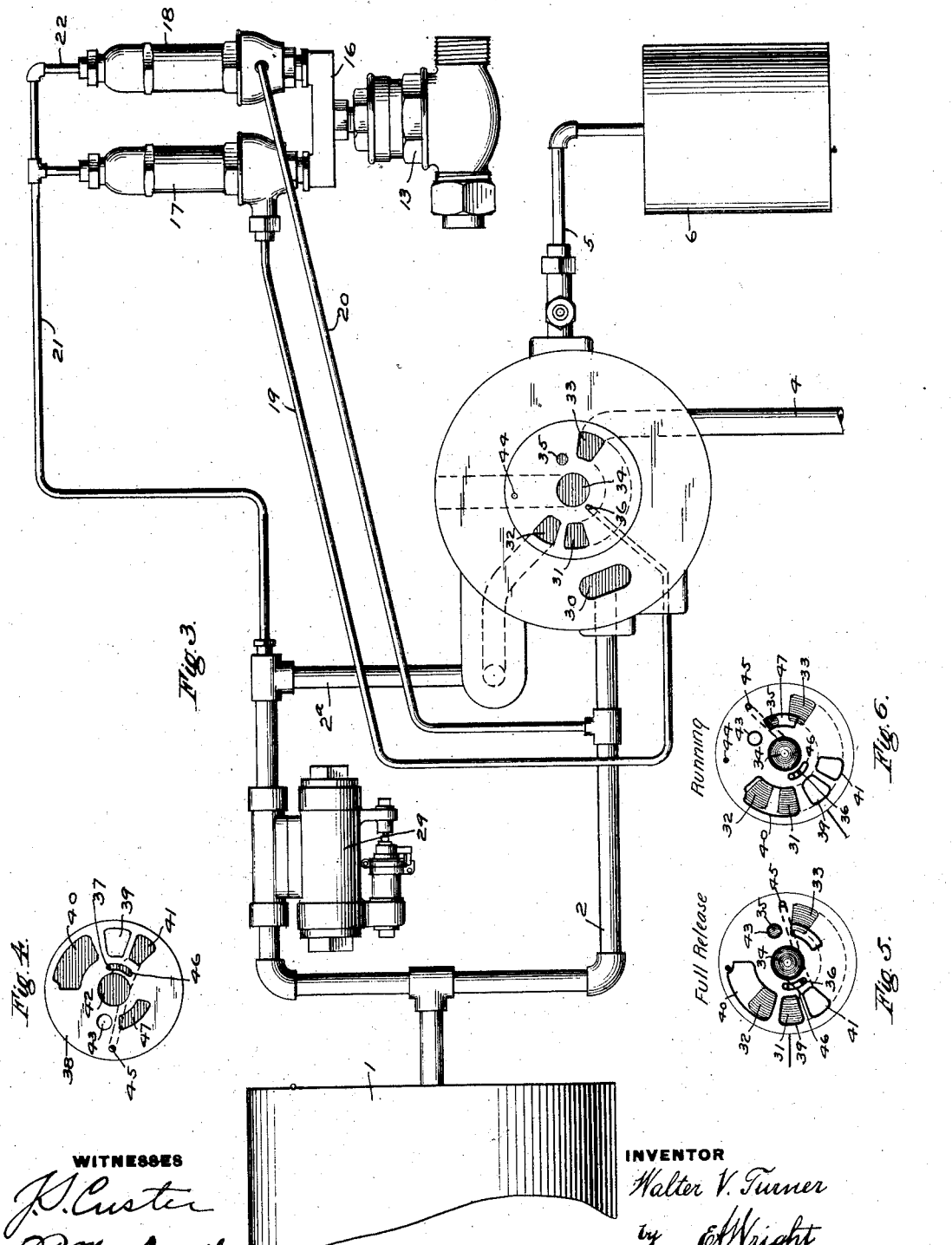

United States Patent Office.

WALTER V. TURNER, OF WILKINSBURG, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

FLUID-PRESSURE BRAKE.

No. 874,260.　　　Specification of Letters Patent.　　　Patented Dec. 17, 1907.

Application filed March 23, 1906. Serial No. 307,666.

*To all whom it may concern:*

Be it known that I, WALTER V. TURNER, a citizen of the United States, residing in Wilkinsburg, in the county of Allegheny and State of Pennsylvania, have invented certain new and useful Improvements in Duplex Pressure-Control Apparatus for Fluid-Pressure Brakes, of which the following is a specification.

This invention relates to fluid pressure brakes, and more particularly to apparatus or systems of this character which are adapted to be operated at either one of two different normal degrees of pressure.

In the running of railway trains, it is often desirable to operate the air brake system at one time at the ordinary or low degree of pressure, such as a maximum main reservoir pressure of 90 pounds per square inch and a maximum train pipe pressure of 70 pounds per square inch, and, at another time at a much higher degree of pressure, such as a maximum main reservoir pressure of 120 or more pounds per square inch and a maximum train pipe pressure of 110 pounds per square inch, as in high speed service. For this purpose the standard engine brake equipment has heretofore been provided with a duplex pressure governor for the air pump and main reservoir, a duplex feed valve mechanism, or two pressure regulating valve devices for controlling the train pipe pressure, and a cock or cocks for cutting in or out the low pressure feed valve device and the low pressure diaphragm of the governor according as it is desired that the system be operated at the low pressure or the high pressure.

The principal object of this invention is to provide improved means for automatically adjusting the pressure governor to give the desired degree of maximum reservoir pressure when the feed valve mechanism is adjusted to any corresponding degree of train pipe pressure, and broadly stated, it consists in supplying fluid under pressure, preferably from the train pipe, to the side of the diaphragm of the pressure governor opposite to the main reservoir pressure whereby the load on the governor diaphragm is automatically varied according as the maximum degree of train pipe pressure is adjusted.

Another feature of my invention comprises a duplex pressure governor, one diaphragm of which is subject to train pipe pressure on one side, while the brake valve controls communication from the main reservoir to the opposite side of the diaphragm, whereby the main reservoir and pump may be governed by one diaphragm when the brake valve is in release or running position, and by the other diaphragm when the brake valve is moved to other positions.

These and other features of my improvements will hereinafter be more fully described and claimed.

In the accompanying drawings, Figure 1 is a diagrammatic view showing in elevation a standard engine brake equipment with my improvement applied thereto; Fig. 2 a vertical sectional view of the pressure governor for the steam pump or air compressor; Fig. 3 a diagrammatic view showing a modification of the engine brake equipment embodying my improvement, the engineer's brake valve seat being indicated in plan; Fig. 4 a face view of the rotary valve of the engineer's brake valve; Fig. 5 a diagram illustrating the relative positions of the ports of the rotary valve and the seat in the full release position of the engineer's brake valve; and Fig. 6 a similar diagram illustrating the positions of the ports in the running position of the engineer's brake valve.

According to the apparatus shown in Figs. 1 and 2, the main reservoir 1 is connected by pipe 2 with the engineer's brake valve 3, which is also connected with the usual train pipe 4 and by pipe 5 with the equalizing reservoir 6. A pipe bracket 7, secured to the side of the engineer's brake valve, is connected by pipes 8 and 9 with a duplex feed valve mechanism comprising two feed valves or pressure regulators 10 and 11, adjusted for different degrees of pressure, and a cut-out cock 12 for cutting in either one of said feed or regulating valves for adjusting the maximum train pipe pressure to either the high or low degree.

The steam pump governor comprises the steam valve casing 13 having a valve 14 and operating piston 15, a siamese fitting 16 and two pressure heads 17 and 18, these having diaphragm chambers 23 and 24, diaphragms 25 and 26, regulating valves 29 and 30, and adjustable springs 27 and 28. The diaphragm chamber 24 of the high pressure head 18 is connected by pipe 20 with the main reservoir pipe 2, while the diaphragm chamber 23 of the low pressure head 17 is connected by pipe 19 with the feed port pipe 8 leading from the pipe bracket of the engineer's brake valve to the feed valve mechanism. As thus far described the apparatus corresponds substantially with the standard Westinghouse engine brake equipment for duplex pressure control, which is well understood by all familiar with the art. According to said standard construction the spring 27 of the low pressure head of the governor is adjusted to a main reservoir pressure of about 90 pounds per square inch in the diaphragm chamber 23, while the spring 28 of the high pressure head is set for a main reservoir pressure of 120 or more pounds per square inch, so that when the low pressure feed valve device is cut in, the main reservoir pressure communicates with the diaphragm chamber 23 of the governor when the engineer's brake valve is in running position through the usual feed port, pipe 8 and pipe 19, and the adjustment of spring 27 then determines the action of the governor valve controlling the steam driven air pump for supplying the main reservoir, as will be readily understood. When the engineer's brake valve is in service or lap positions, the port leading to pipe 8 is closed, so that the high pressure spring 28 then controls the action of the governor.

When the system is adjusted to operate at the high degree of pressure by turning the cut out cock 12, communication through the pipe 19 to the low pressure head of the governor is also closed in the standard apparatus, so that the high pressure spring and governor head then operates to control the governor for all positions of the engineer's brake valve.

According to my present improvements, however, a pipe 21 communicating with pipe 9 and the train pipe leads to the spring casing of the low pressure head of the governor on the opposite side of the diaphragm 25. In this case the spring 27 is adjusted for an amount equal to about 20 pounds per square inch. Then when the feed valve mechanism is adjusted to give the desired degree of train pipe pressure the pressure upon the diaphragm of the governor head is also automatically adjusted to give the corresponding maximum degree of main reservoir pressure.

The spring 28 of the high pressure governor head may be adjusted as before to 120 or more pounds, or, if desired, a pipe connection 22 may be made for admitting train pipe pressure to this spring chamber on the back of diaphragm 26 also, and the spring 28 may then be adjusted to an excess pressure of about 30 or 40 pounds per square inch. By thus admitting fluid at the desired degree to the outer side of the pump governor diaphragm it is only necessary to adjust the feed valve mechanism to the desired degree of train pipe pressure, as the governor then operates automatically to properly regulate the main reservoir pressure.

In the modification illustrated in Fig. 3, I have shown my improvement applied to a brake valve having a port 30 connected to main reservoir pipe 2 for admitting main reservoir pressure to the rotary valve chamber, and a port 32 in the valve seat connected to the pipe 2ª leading to the duplex feed valve 29 interposed between the main reservoir pipe 2 and pipe 2ª for regulating the pressure in the latter pipe to the desired maximum degree of train pipe pressure. The feed valve 29 may be of any suitable or preferred construction, adapted to be readily adjusted to either one of two different degrees of pressure.

The brake valve seat may be provided with an equalizing port 35, and two ports 31 and 33 communicating with the train pipe 4. The pipe 21 in this structure leads from the pipe 2ª to the low pressure governor head 17, while pipe 19 communicates with an additional port 36 in the brake valve seat, and the pipe 20 connects with the main reservoir pipe 2, as before described.

The rotary valve 38, Fig. 4, may be provided with through ports 39 and 43, and cavities 40, 41 and 42 to coöperate with the ports of the valve seat to properly control the train pipe pressure for operating the brakes, and a cavity 46 having a small port 37 extending through the valve is also provided for registering with the port 36 in the valve seat in the release and running positions of the valve, as illustrated in Figs. 5 and 6.

In the full release position of the brake valve, Fig. 5, air at full main reservoir pressure from the chamber above the rotary valve, passes through ports 39 and 31 to train pipe 4, and through ports 43 and 35 to the usual equalizing reservoir. When turned to running position, Fig. 6, the supply of excess pressure from the main reservoir to the train pipe is cut off and the air at the reduced pressure, as determined by the feed valve 29, flows through pipe 2ª, port 32, cavity 40 and port 31 to the train pipe 4, and from the train pipe through port 33, cavity 47 and port 35 to the equalizing reservoir. In both these positions air at main reservoir pressure is admitted through ports 37, 46, and 36 and pipe 19 to the diaphragm chamber of the low pressure governor head 17. A small port 44 in the valve seat also communicates with the equalizing reservoir and a service application of the brakes is made by turning the valve to register with ports 44 and 45, allowing a preliminary exhaust through ports 42 and 34, the usual equalizing piston then operating in the ordinary manner to open the train pipe discharge valve to make the desired reduction in train pipe pressure. In lap position all ports are closed, while in emergency position the train pipe is open to the atmosphere through the ports 33, 41, 42 and 34.

When the brake valve is turned to service and lap positions for applying the brakes, it will be noticed that the port 36 is closed, so that the low pressure head of the governor is cut out and the pump is then governed by the high pressure head, which allows the pump to accumulate a higher pressure in the main reservoir.

It will now be seen that the result obtained from this construction is substantially the same as that described in connection with the apparatus as shown in Fig. 1, that is, that air from the feed regulating valve is admitted to the spring chamber of the low pressure governor head to automatically adjust the governor at the time that the feed valve is adjusted to give the desired degree of train pipe pressure, and pipe 19 leading to the chamber 23 of the low pressure diaphragm is open to the main reservoir pressure in the running and release positions of the engineer's brake valve, but cut out in the other positions, so that the high pressure governor head controls the pump, while the brakes are being applied, and operates to store up an excess pressure in the main reservoir to assist in releasing the brakes when the brake valve is again turned to full release and running positions.

Having now described my invention, what I claim as new and desire to secure by Letters Patent, is:—

1. In a fluid pressure brake, the combination with a main reservoir, engineer's brake valve, and train pipe, of a pressure governor having a diaphragm chamber and diaphragm subject to the main reservoir pressure, and means for admitting air from the train pipe to the opposite side of the diaphragm.

2. In a fluid pressure brake, the combination with a main reservoir, engineer's brake valve, and train pipe, of a pressure governor having a diaphragm subject on one side to the main reservoir pressure and on the other side to a spring and the train pipe pressure.

3. In a fluid pressure brake, the combination with a main reservoir, engineer's brake valve, and train pipe, of a pressure governor having a diaphragm chamber, a diaphragm subject on one side to the main reservoir pressure, means for admitting air from the train pipe to the opposite side of said diaphragm, and an adjustable feed valve device for regulating the normal degree of train pipe pressure.

4. In a fluid pressure brake, the combination with a main reservoir, engineer's brake valve, and train pipe, of a pressure governor having a diaphragm chamber, a diaphragm subject on one side to the main reservoir pressure, and on the other side to the train pipe pressure and an adjustable spring, and an adjustable feed valve device for regulating the normal degree of train pipe pressure.

5. In a fluid pressure brake, the combination with a main reservoir, engineer's brake valve, and train pipe, of a duplex pressure governor having two diaphragms subject on one side to main reservoir pressure, and means for admitting fluid at train pipe pressure to the opposite side of one of said diaphragms.

6. In a fluid pressure brake, the combination with a main reservoir, engineer's brake valve, and train pipe, of a duplex pressure governor having two diaphragms subject on one side to main reservoir pressure, adjustable load devices acting on the opposite side of said diaphragms, one being set heavier than the other, and means for admitting fluid at train pipe pressure to the loaded side of one of said diaphragms.

7. In a fluid pressure brake, the combination with a main reservoir, engineer's brake valve, and train pipe, of a duplex pressure governor having two diaphragms subject on one side to main reservoir pressure, and on the opposite side to adjustable springs, means for admitting fluid at train pipe pressure to the opposite side of one of said diaphragms, and an adjustable feed valve device for regulating the train pipe to either one of two different pressures.

8. In a fluid pressure brake, the combination with a main reservoir, and train pipe, of a duplex pressure governor having two diaphragm chambers and diaphragms, one diaphragm chamber communicating with the main reservoir, an engineer's brake valve controlling communication from the main reservoir to the other diaphragm chamber, and means for admitting fluid under pressure to the opposite side of the latter diaphragm.

9. In a fluid pressure brake, the combination with a main reservoir, and train pipe, of a duplex pressure governor having two diaphragm chambers and diaphragms, one diaphragm chamber communicating with the main reservoir, an engineer's brake valve having ports for opening communication from the main reservoir to the other diaphragm chamber in the running position, and means for admitting fluid at train pipe pressure to the opposite side of the latter diaphragm.

10. In a fluid pressure brake, the combination with a main reservoir, and train pipe, of a duplex pressure governor having two diaphragm chambers and diaphragms, one diaphragm chamber communicating with the main reservoir, an engineer's brake valve controlling communication from the main reservoir to the other diaphragm chamber, means for admitting fluid at train pipe pressure to the opposite side of the latter diaphragm, and a duplex feed valve mechanism for regulating the train pipe to either one of two different pressures.

11. In a fluid pressure brake, the combination with a main reservoir, and train pipe, of a pressure governor having a diaphragm chamber, a diaphragm subject on one side to the main reservoir pressure, and means for admitting air under pressure to the opposite side of the diaphragm.

12. In a fluid pressure brake, the combination with a main reservoir, engineer's brake valve, and train pipe, of a pressure governor having a diaphragm chamber, a diaphragm subject on one side to the main reservoir pressure, a feed valve device between the main reservoir and the engineer's brake valve for regulating the normal degree of train pipe pressure, and means for supplying fluid from said feed valve to the opposite side of the governor diaphragm.

13. In a fluid pressure brake, the combination with a main reservoir, brake valve, and train pipe, of a pressure governor mechanism adapted to be adjusted for different degrees of main reservoir pressure, a feed valve device for adjusting the train pipe pressure, and means operating automatically, upon the adjustment of the feed valve device, to also adjust the pressure governor mechanism.

14. In a fluid pressure brake, the combination with a main reservoir, brake valve, and train pipe, of a pressure governor mechanism adapted to be adjusted for different degrees of main reservoir pressure, a duplex feed valve device for adjusting the train pipe to either one of two given pressures, and means operating automatically, upon the adjustment of the feed valve device to one of said pressures, to adjust the governor mechanism to a corresponding pressure.

15. In a fluid pressure brake, the combination with a reservoir, a pressure governor therefor, and a train pipe, of means operating according to the degree of train pipe pressure for automatically adjusting the pressure governor to a corresponding degree.

16. In a fluid pressure brake, the combination with a main reservoir, a pressure governor therefor, and a train pipe, of means operating according to the degree of train pipe pressure for automatically adjusting the governor, and a brake valve having connections for controlling said governor.

17. In a fluid pressure brake, the combination with a main reservoir, a pressure governor therefor, and a train pipe, of means operating according to the degree of train pipe pressure for automatically adjusting the governor, and a brake valve having means for cutting out said governor in brake applied position.

18. In a fluid pressure brake, the combination with a main reservoir, a pressure governor therefor, and a train pipe, of means operating according to the degree of train pipe pressure for automatically adjusting the governor, and a brake valve having ports and connections for cutting in said governor in normal running position and for cutting it out upon movement to apply brakes.

19. In a fluid pressure brake, the combination with a main reservoir, a duplex pressure governor device therefor, and a train pipe, of means operating according to the degree of train pipe pressure for automatically adjusting one of the governors, and a brake valve having connections for controlling the same governor.

In testimony whereof I have hereunto set my hand.

WALTER V. TURNER.

Witnesses:
  R. F. EMERY,
  J. B. MACDONALD.